US012583477B2

(12) United States Patent
Bin-Nun et al.

(10) Patent No.: US 12,583,477 B2
(45) Date of Patent: Mar. 24, 2026

(54) AUTONOMOUS VEHICLE VALIDATION USING REAL-WORLD ADVERSARIAL EVENTS

(71) Applicant: Motional AD LLC, Boston, MA (US)

(72) Inventors: Amitai Bin-Nun, Silver Spring, MD (US); Radboud Duintjer Tebbens, Winchester, MA (US); Anne Collin, Cambridge, MA (US); Cristhian Guillermo Lizarazo Jimenez, Boston, MA (US)

(73) Assignee: Motional AD LLC, Boston, MA (US)

( * ) Notice: Subject to any disclaimer, the term of this patent is extended or adjusted under 35 U.S.C. 154(b) by 285 days.

(21) Appl. No.: 17/740,251

(22) Filed: May 9, 2022

(65) Prior Publication Data

US 2023/0356750 A1     Nov. 9, 2023

(51) Int. Cl.
B60W 60/00 (2020.01)
B60W 30/095 (2012.01)

(52) U.S. Cl.
CPC .... B60W 60/0015 (2020.02); B60W 30/0956 (2013.01); B60W 2556/10 (2020.02); B60W 2556/20 (2020.02)

(58) Field of Classification Search
CPC ......... B60W 60/0015; B60W 30/0956; B60W 2556/10; B60W 2556/20; G06F 30/20
See application file for complete search history.

(56) References Cited

U.S. PATENT DOCUMENTS

| | | | |
|---|---|---|---|
| 9,645,577 B1 | 5/2017 | Frazzoli et al. | |
| 10,235,882 B1 | 3/2019 | Aoude et al. | |
| 11,158,002 B1 | 10/2021 | Brandmaier et al. | |
| 11,767,030 B1 * | 9/2023 | Bagschik ............... | G06V 20/56 701/23 |
| 11,830,357 B1 | 11/2023 | Murphy | |

(Continued)

FOREIGN PATENT DOCUMENTS

| | | |
|---|---|---|
| JP | 5252001 B2 | 7/2013 |
| WO | WO 2021020311 A1 | 2/2021 |

OTHER PUBLICATIONS

[No Author Listed], "IEEE Standard for Assumptions in Safety-Related Models for Automated Driving Systems," IEEE Std 2846-2022, Apr. 2022, 59 pages.

(Continued)

*Primary Examiner* — Ryan Rink
(74) *Attorney, Agent, or Firm* — Fish & Richardson P.C.

(57) ABSTRACT

Provided are methods, systems, and computer program products for autonomous vehicle validation using real-world adversarial events are described herein. The method includes obtaining a record of human driver data and extracting at least one safety critical scenario from the record to create a test data set associated with operation of vehicles by human drivers during safety critical scenarios. The method includes simulating operation of a vehicle under evaluation during safety critical scenarios and comparing a response of the vehicle under evaluation to the operation of vehicles by human drivers. The method further includes validating a response of the vehicle under evaluation during the simulated operation according to the test data set by transforming the vehicle response into a safety indicator.

23 Claims, 9 Drawing Sheets

(56) References Cited

U.S. PATENT DOCUMENTS

| | | | |
|---|---|---|---|
| 11,940,793 | B1 | 3/2024 | Kavalar |
| 2009/0326751 | A1 | 12/2009 | Otake et al. |
| 2017/0277194 | A1 | 9/2017 | Frazzoli et al. |
| 2018/0357409 | A1 | 12/2018 | Jantz et al. |
| 2019/0100216 | A1 | 4/2019 | Volos et al. |
| 2019/0145860 | A1* | 5/2019 | Phillips ................ G05D 1/0088 |
| | | | 701/33.9 |
| 2019/0202476 | A1 | 7/2019 | Tao et al. |
| 2019/0206236 | A1 | 7/2019 | Tao et al. |
| 2019/0206255 | A1 | 7/2019 | Tao et al. |
| 2019/0213103 | A1* | 7/2019 | Morley ............... G06F 11/3692 |
| 2019/0291728 | A1 | 9/2019 | Shalev-Shwartz et al. |
| 2019/0295179 | A1 | 9/2019 | Shalev-Shwartz et al. |
| 2020/0019174 | A1 | 1/2020 | Cheriton |
| 2020/0189575 | A1 | 6/2020 | Wongpiromsarn et al. |
| 2020/0192391 | A1 | 6/2020 | Vora et al. |
| 2020/0286309 | A1 | 9/2020 | Chellapilla et al. |
| 2020/0385024 | A1 | 12/2020 | Wongpiromsarn |
| 2021/0065551 | A1 | 3/2021 | Manohar et al. |
| 2021/0094540 | A1 | 4/2021 | Bagschik et al. |
| 2021/0096571 | A1 | 4/2021 | Madalavalasa et al. |
| 2021/0097148 | A1 | 4/2021 | Bagschik et al. |
| 2021/0110484 | A1 | 4/2021 | Shalev-Shwartz et al. |
| 2021/0303877 | A1* | 9/2021 | Jain ......................... G06V 20/20 |
| 2021/0403034 | A1 | 12/2021 | Lapin et al. |
| 2022/0080962 | A1 | 3/2022 | Bin-Nun et al. |
| 2022/0080975 | A1* | 3/2022 | Drollinger ........ B60W 60/0015 |
| 2022/0227367 | A1 | 7/2022 | Kario et al. |
| 2022/0289238 | A1 | 9/2022 | Wang |
| 2023/0171142 | A1 | 6/2023 | Kassas et al. |
| 2023/0182754 | A1* | 6/2023 | Dong .................... B60W 40/02 |
| | | | 701/26 |
| 2023/0286536 | A1 | 9/2023 | Belman et al. |
| 2023/0303052 | A1 | 9/2023 | Gesang et al. |
| 2023/0331256 | A1 | 10/2023 | Collin et al. |
| 2023/0347925 | A1* | 11/2023 | Stonier ................. G06F 18/214 |
| 2023/0394896 | A1* | 12/2023 | Nica .................... G06F 11/3676 |
| 2023/0401911 | A1* | 12/2023 | Zhu ........................ G06V 20/58 |
| 2024/0134386 | A1* | 4/2024 | Nag ........................ G05D 1/225 |
| 2024/0303386 | A1* | 9/2024 | Haupt ................. G06F 11/3684 |

OTHER PUBLICATIONS

International Search Report and Written Opinion in International Appln. No. PCT/US2023/020738, dated Aug. 17, 2023, 13 pages.

Quante et al., "Human Performance in Critical Scenarios as a Benchmark for Highly Automated Vehicles," Automotive Innovation, Jul. 2021, 10 pages.

Trustworthy AI Team, "Keeping score: Evaluating safety metrics for autonomous vehicles," Blog, May 7, 2021, retrieved Sep. 5, 2023, retrieved from URL <https://trustworthy.ai/2021/05/07/keeping-score.html>, 13 pages.

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

Smadi et al., "Naturalistic Driving Study: Development of the Roadway Information Database," Transportation Research Board, The Second Strategic Highway Research Program (SHRP-2) Report S2-S04A-RW-1, 2015, 120 pages.

International Preliminary Report on Patentability in International Appln. No. PCT/US2023/020738, mailed on Nov. 21, 2024, 7 pages.

Weast, "P2846-D6 Jul. 19, 2021: P2846/D6, Draft Standard for Assumptions for Models in Safety-Related Automated Vehicle Behavior," VT/ITS/AV Decision Making Work Group of the IEEE Vehicular Technology Society, Jul. 19, 2021, pp. 1-74.

Xiao et al., "Rule-based Optimal Control for Autonomous Driving," CoRR, Submitted on Jan. 14, 2021, arXiv:2101.05709v1, 13 pages.

Xiao et al., "Rule-based optimal control for autonomous driving," Proceedings of the 14th ACM Conference on Security and Privacy in Wireless and Mobile Networks, ACMPUB27, May 19, 2021, pp. 143-154.

* cited by examiner

600

Obtain a Record of Data Associated with Human Driving — 702

Extract a Safety Critical Scenario from the Record — 704

Simulate the Operation of a Vehicle in the Safety Critical Scenario — 706

Compare a Response of the Vehicle to Simulation to the Record of Data Associated with Human Driving — 708

Validate the Vehicle Response — 710

700

Determine an AV Near-Collision Rate According to On-Road Measurements ⟋⎼802

Determine the Near-Collisions that Result in Collisions According to Simulated Safety Critical Scenarios from the Record ⟋⎼804

Calculate an Overall Collision Rate Based on Collisions During Simulated Operation of the AV Relative to On-Road Human Driver Collisions ⟋⎼806

<u>800</u>

Obtain a Record of Data Associated with Human Driving — 902

Extract a Safety Critical Scenario from the Record — 904

Determine One or More Parameters Associated with Safety Critical Scenario — 906

Create Alternative Scenarios by Modifying the Parameters Associated with the Safety Critical Scenario — 908

Validate the Vehicle Response Based on Alterative Scenarios — 910

900

AUTONOMOUS VEHICLE VALIDATION USING REAL-WORLD ADVERSARIAL EVENTS

BACKGROUND

Validation of automotive systems generally discovers a precise reliability quantification across a large operational design domain (ODD) to ensure safe, predictable vehicle operation. Statistical-based validation often fails to evaluate uncertainties associated with vehicle operation and relies on a small, limited ODD. Moreover, statistical validation requires a large data set captured as vehicles travel through real-world environments. Validation based on this large data set is time consuming.

DETAILED DESCRIPTION

Figure 1:
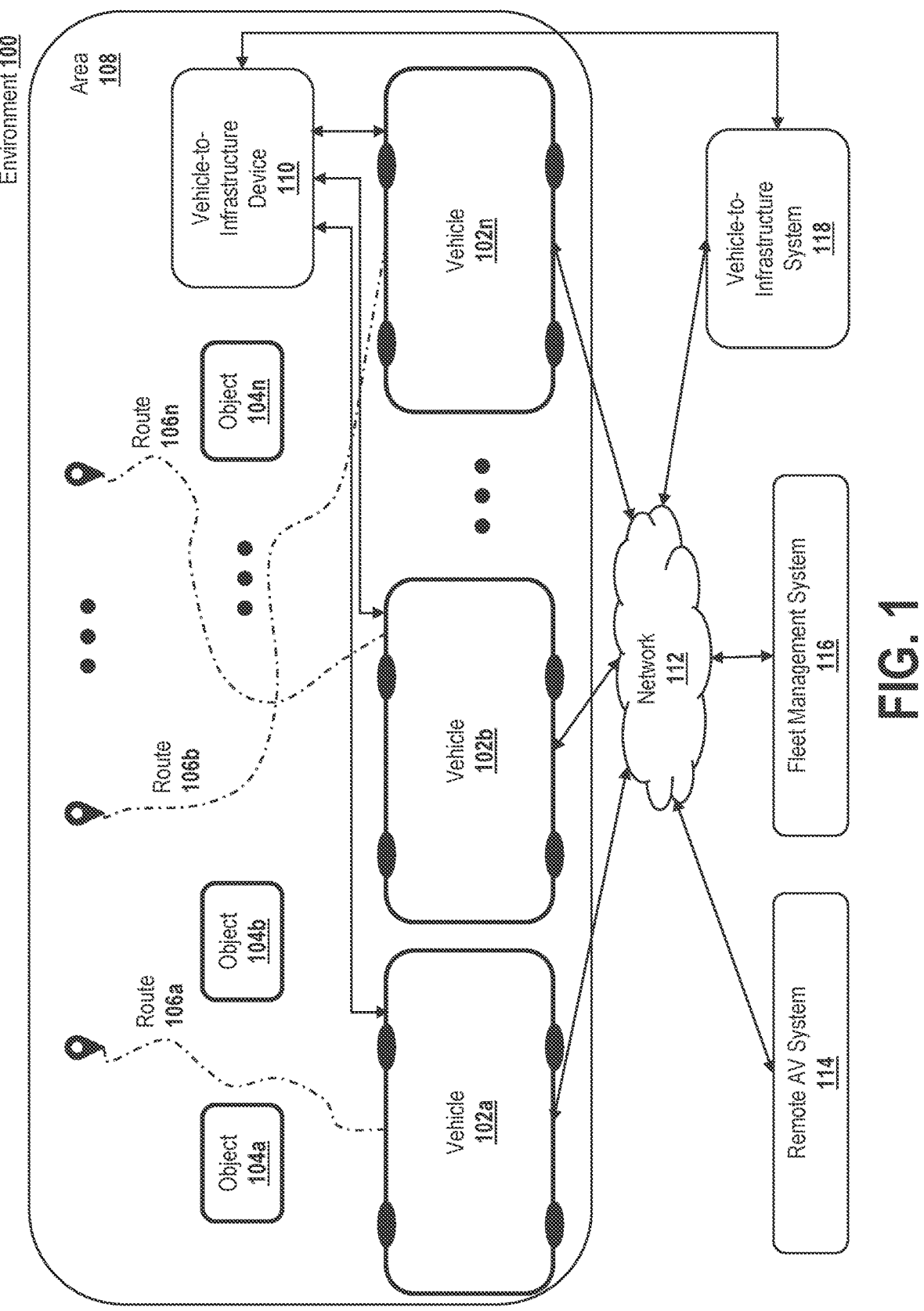
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement autonomous vehicle validation using real-world adversarial events. For example, an autonomous driving system (such as an autonomous vehicle) can have any number of systems that enable operation of the vehicle. Prior to deployment, the operation of the vehicle is validated to ensure the vehicle operates with safety of the intended functionality. Validating the operation of the vehicle can include validation of the safety of a vehicle when operating within an operational design domain (ODD). In examples, when navigating through an ODD a driving function of the vehicle is validated by replicating driving scenarios and quantifying the vehicle response according to a test set of safety critical scenarios. The test set of safety critical scenarios is extracted from continuous human driver data. The test set includes safety critical scenarios extracted according to one or more predetermined criteria. The response of the vehicle when the test set is applied during a simulation is compared to the continuous human driver data to enable validation of the vehicle in view of a standard derived from the continuous human driver data.

By virtue of the implementation of systems, methods, and computer program products described herein, techniques for autonomous vehicle validation using real-world adversarial events enables scenario-based validation with data automatically linked to real-world data (e.g., human driver data). Some of the advantages of these techniques include validation that increases confidence in vehicle safety and performance. Additionally, the techniques enable validation with lower mileage requirements than purely road based validation. The present techniques provide insight into an additional dimension of driving performance (e.g., mitigation of safety critical scenarios). Additionally, the present techniques use organic scenarios that correspond to organic data sets, so the performance of the vehicle in those scenarios is more relevant than using either synthetic scenarios or isolated organic scenarios.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, remote AV system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, remote AV system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
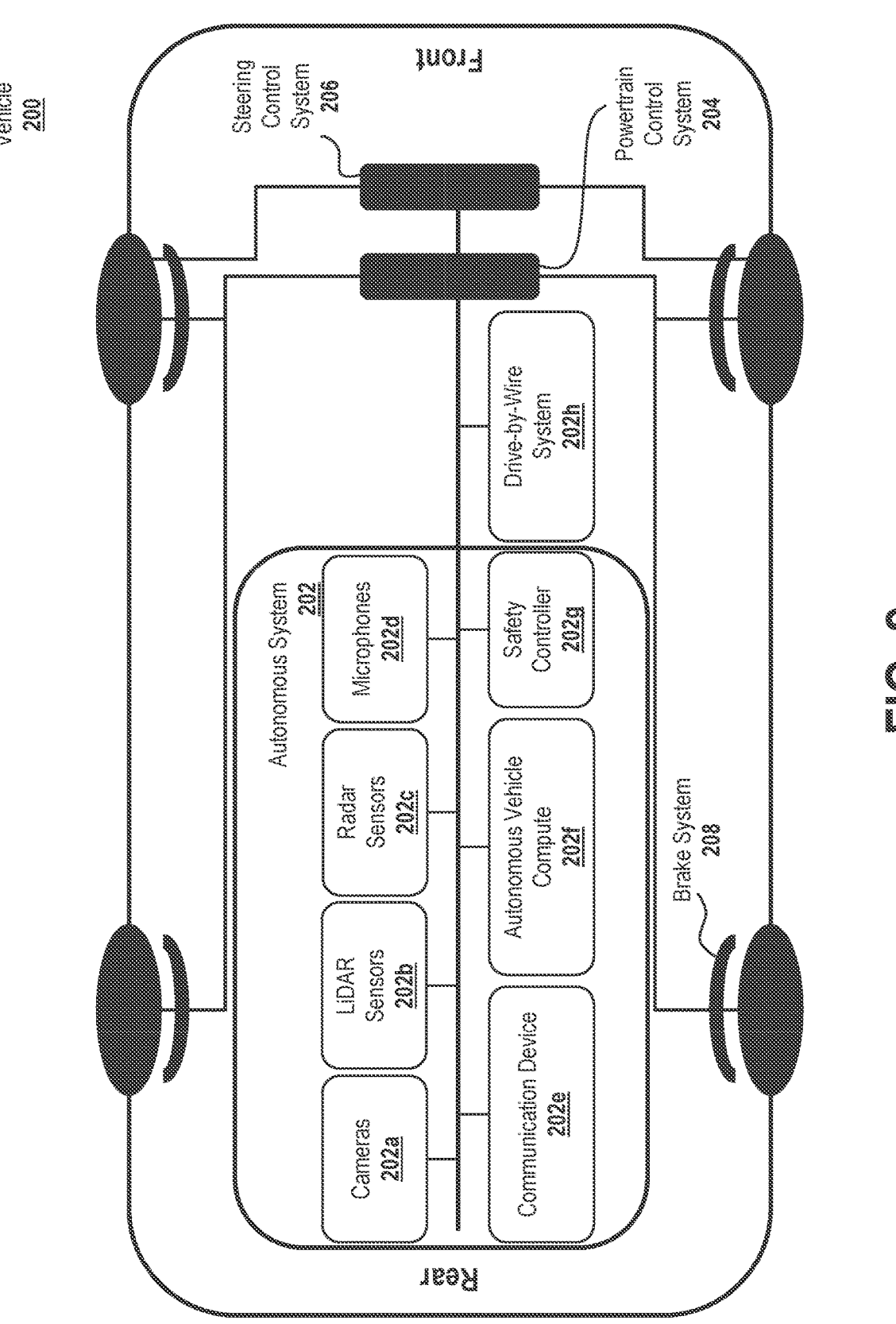
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202*e*, autonomous vehicle compute 202*f*, and drive-by-wire (DBW) system 202*h*.

Figure 3:
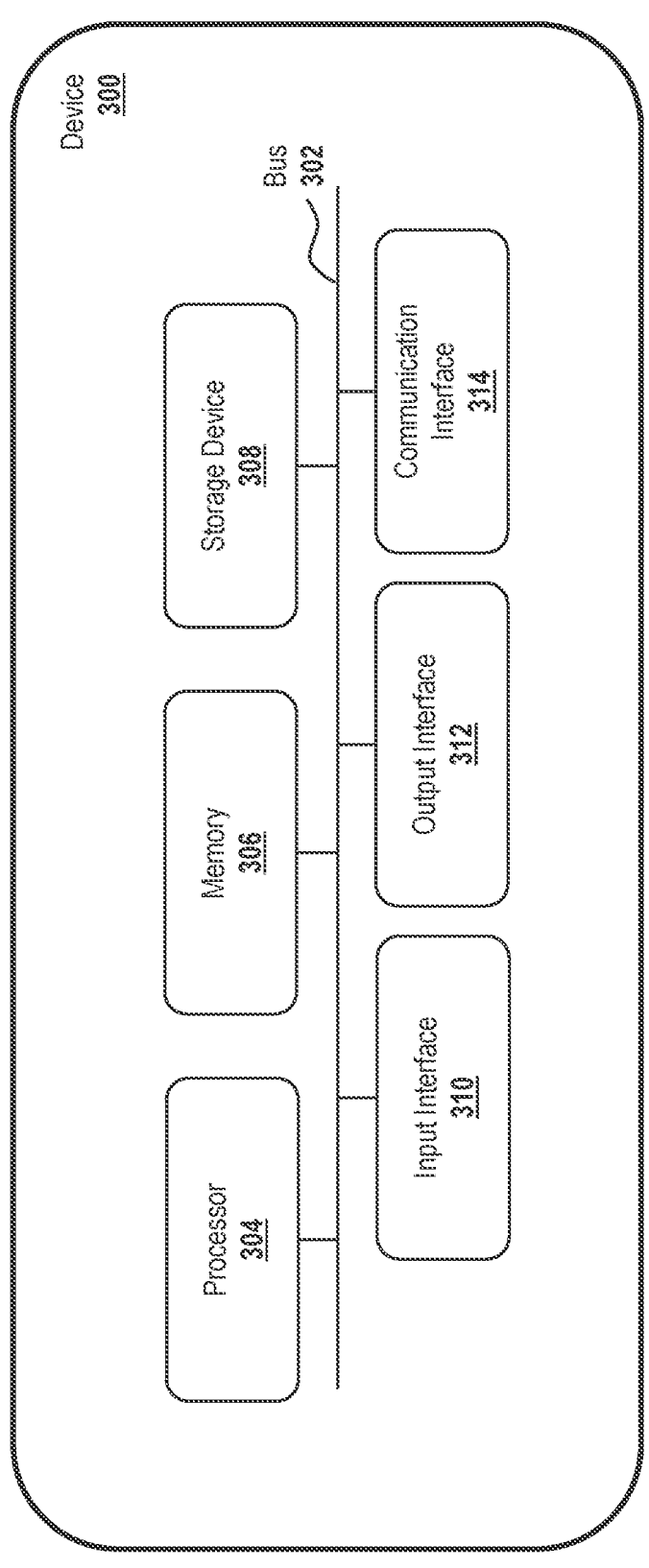
FIG. 3 is a diagram of components of one or more devices and/or one or more systems of FIGS. 1 and 2.

Cameras 202*a* include at least one device configured to be in communication with communication device 202*e*, autonomous vehicle compute 202*f*, and/or safety controller 202*g* via a bus (e.g., a bus that is the same as or similar to bus 302 of FIG. 3). Cameras 202*a* include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202*a* generates camera data as output. In some examples, camera 202*a* generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202*a* includes a plurality of independent cameras configured on (e.g., positioned on) a vehicle to capture images for the purpose of stereopsis (stereo vision). In some examples, camera 202*a* includes a plurality of cameras that generate image data and transmit the image data to autonomous vehicle compute 202*f* and/or a fleet management system (e.g., a fleet management system that is the same as or similar to fleet management system 116 of FIG. 1). In such an example, autonomous vehicle compute 202*f* determines depth to one or more objects in a field of view of at least two cameras of the plurality of cameras based on the image data from the at least two cameras. In some embodiments, cameras 202*a* is configured to capture images of objects within a distance from cameras 202*a* (e.g., up to 100 meters, up to a kilometer, and/or the like). Accordingly, cameras 202*a* include features such as sensors and lenses that are optimized for perceiving objects that are at one or more distances from cameras 202*a*.

In an embodiment, camera 202*a* includes at least one camera configured to capture one or more images associated with one or more traffic lights, street signs and/or other physical objects that provide visual navigation information. In some embodiments, camera 202*a* generates traffic light data associated with one or more images. In some examples, camera 202*a* generates TLD data associated with one or more images that include a format (e.g., RAW, JPEG, PNG, and/or the like). In some embodiments, camera 202*a* that generates TLD data differs from other systems described herein incorporating cameras in that camera 202*a* can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202*b* include at least one device configured to be in communication with communication device 202*e*, autonomous vehicle compute 202*f*, and/or safety controller 202*g* via a bus (e.g., a bus that is the same as or similar to bus 302 of FIG. 3). LiDAR sensors 202*b* include a system configured to transmit light from a light emitter (e.g., a laser transmitter). Light emitted by LiDAR sensors 202*b* include light (e.g., infrared light and/or the like) that is outside of the visible spectrum. In some embodiments, during operation, light emitted by LiDAR sensors 202*b* encounters a physical object (e.g., a vehicle) and is reflected back to LiDAR sensors 202*b*. In some embodiments, the light emitted by LiDAR sensors 202*b* does not penetrate the physical objects that the light encounters. LiDAR sensors 202*b* also include at least one light detector which detects the light that was emitted from the light emitter after the light encounters a physical object. In some embodiments, at least one data processing system associated with LiDAR sensors 202*b* generates an image (e.g., a point cloud, a combined point cloud, and/or the like) representing the objects included in a field of view of LiDAR sensors 202*b*. In some examples, the at least one data processing system associated with LiDAR sensor 202*b* generates an image that represents the boundaries of a physical object, the surfaces (e.g., the topology of the surfaces) of the physical object, and/or the like. In such an example, the image is used to determine the boundaries of physical objects in the field of view of LiDAR sensors 202*b*.

Radio Detection and Ranging (radar) sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* include at least one device configured to be in communication with cameras 202*a*, LiDAR sensors 202*b*, radar sensors 202*c*, microphones 202*d*, autonomous vehicle compute 202*f*, safety controller 202*g*, and/or DBW system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102) and/or one or more devices of network 112 (e.g., one or more devices of a system of network 112). In some embodiments, one or more devices of vehicles 102 (e.g., one or more devices of a system of vehicles 102) and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
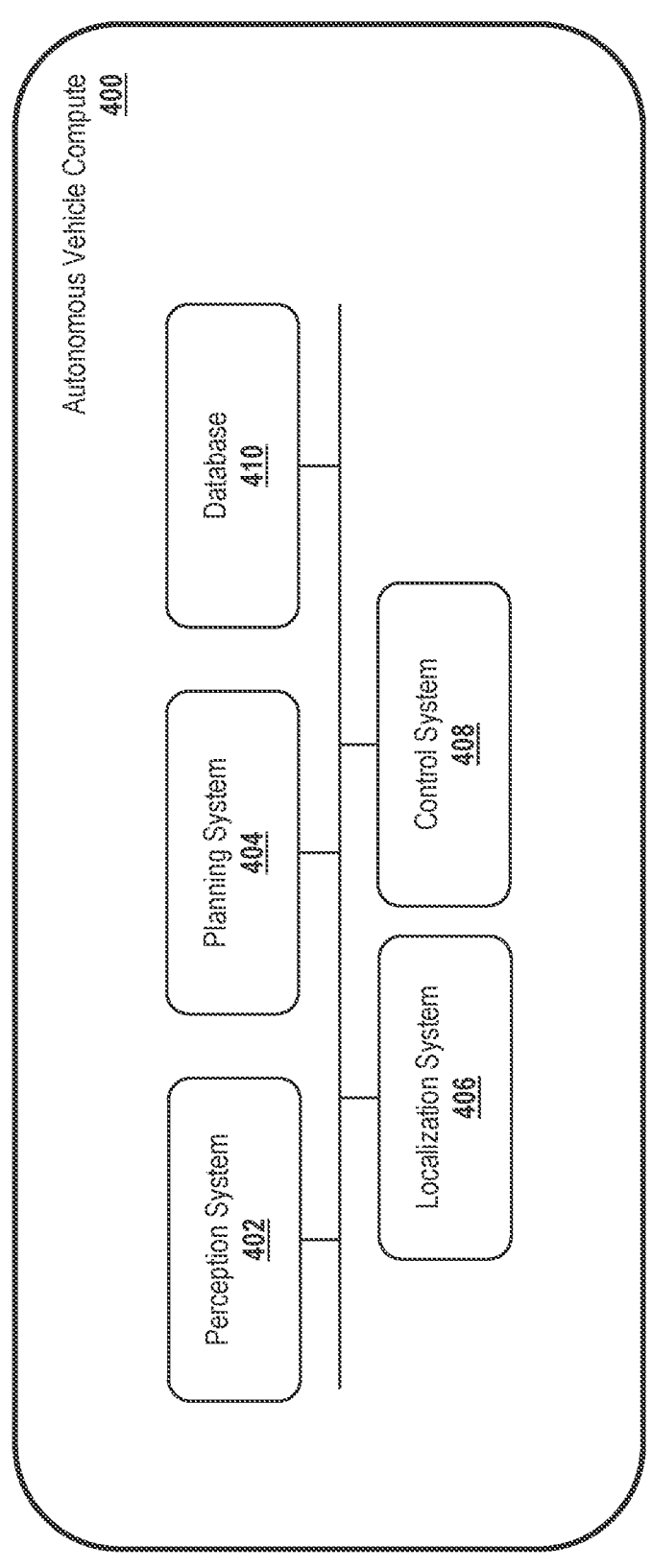
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
FIG. 5 is a diagram of an implementation of a process for autonomous vehicle validation using real-world adversarial events.

Referring now to FIG. 5, illustrated is a diagram of an implementation 500 of a process for autonomous vehicle validation using real-world adversarial events. In some embodiments, implementation 500 includes scenarios 510 that are extracted from continuous human driver data. In some embodiments, sensor data representative of scenarios 510 are input to vehicle 502 to simulate operation of the vehicle 502. In embodiments, predetermined criteria enables extraction of scenarios that include traffic conflicts and near traffic conflicts, where a near traffic conflict is an event in which no property was damaged and no personal injury was sustained, but where, given the absence of an evasive maneuver, damage or injury easily could have occurred. A near traffic conflict is an occurrence defined by a possibility of a traffic conflict but for a maneuver initiated by the vehicle. Traffic conflicts are contact between the vehicle (e.g., vehicle 502) and an actor in an environment. In examples, the predetermined criteria is based on kinematic triggers that correlate to near traffic conflicts. Additionally, in examples, predetermined criteria is based on historical data that corresponds to known loss-producing events, where a traffic conflict occurred.

Generally, the predetermined criteria strongly correlates to one or more kinematic triggers. The correlation enables the identification of near-traffic conflicts. In embodiments, the definition of kinematic triggers is derived based on an objective to accurately extract safety-relevant events (traffic conflicts and near-traffic conflict). These values are estimated by setting a classification problem to extract events of interest. For example, safety relevant events are extracted from a database based on predetermined criteria (e.g. parameters including deceleration above a certain threshold, or a rapid turn above a certain threshold). This extracted set of events include near-traffic conflicts but also many non near-traffic conflict events. In embodiments, the identification of near-traffic conflicts is based on a definition of an evasive maneuver, where a successful evasive maneuver indicates near-traffic conflict.

In embodiments, operation of the vehicle 502 is simulated by providing sensor data representative of scenarios 510 as input to the AV compute (e.g., AV stack) of the vehicle 502. For example, sensor data representative of scenarios 510 are provided as input to perception system 402, planning system 404, localization system 406, control system 408, and database 410 (FIG. 4) as included and/or implemented in an autonomous navigation system of a vehicle (e.g., autonomous vehicle compute 202f of vehicle 200). The control system 504b generates a control signal 518 that is transmitted (520) to a DBW system 506. In embodiments, the output of the autonomous vehicle compute is simulated output that represents a response of the vehicle to the scenarios. In embodiments, the simulated response of the vehicle to the scenarios is compared to the known response of a vehicle in the corresponding continuous human driver data. Through this comparison, various vehicle systems are validated based of the response of the vehicle to the scenarios.

In some examples, kinematic triggers are analyzed in real time to determine near traffic conflicts during operation of an autonomous driving system. For example, when an autonomous vehicle observes other vehicles in an environment suddenly braking, a near-traffic conflict is identified. Perception (e.g., perception system 402 of FIG. 4) and localization (e.g., localization system 406 of FIG. 4) information is used estimate the kinematics of other agents. The kinematics of other agents are compared with thresholds associated with kinematic triggers (e.g., deceleration, acceleration, jerk) that are pre-defined. In this example, the autonomous vehicle can access one or more systems to respond to the near-traffic conflict identified in real time. For example, an autonomous vehicle can consult remote vehicle assistance (RVA) in response to a near traffic conflict Generally, the present techniques enable the validation of functional safety of an AV in scenarios that are known to be dangerous for human drivers (e.g., traffic conflicts, near traffic conflicts, etc.). As described herein functional safety refers to an ability of a system to perform an intended function correctly or fail in a predictable manner. The present techniques enable validation using pointed, predetermined scenarios as opposed to statistical testing. Generally, statistical testing refers to subjecting a vehicle to driving as much as possible while avoiding traffic conflicts to create statistical confidence that the AV performs as expected (e.g., outperforms a human driver). Statistical testing is distinct from deliberately extracting a scenario that satisfies predetermined criteria and is linked to continuous human driver data.

Figure 6:
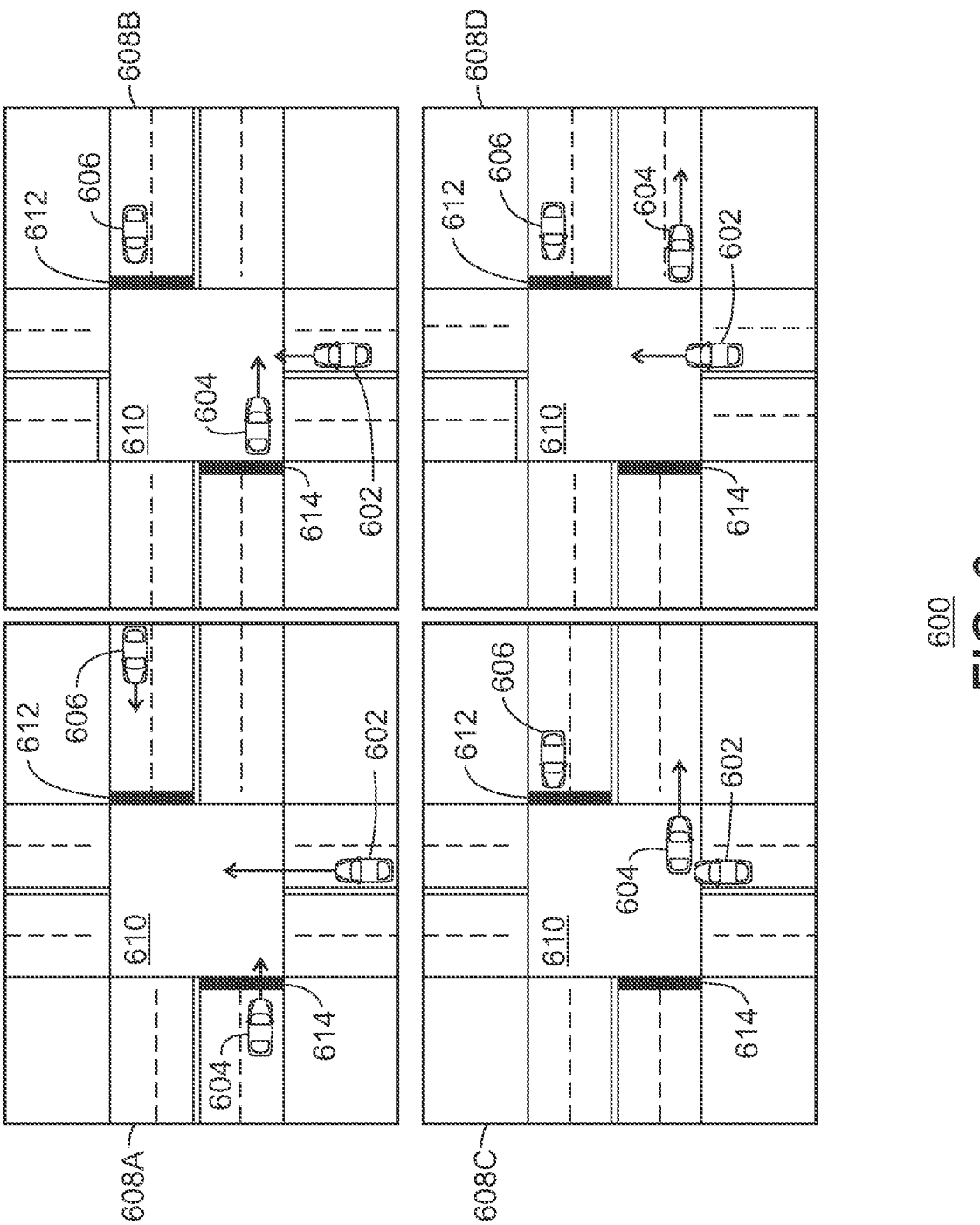
FIG. 6 is an illustration of exemplary continuous human driver data.

FIG. 6 is an illustration of exemplary continuous human driver data 600. In the example of FIG. 6, a vehicle 602, a vehicle 604, and a vehicle 606 are illustrated at a series of timestamps 608A, 608B, 608C, and 608D (collectively referred to as timestamps 608). For ease of description, a limited number of timestamps are illustrated. However, the present techniques are applicable to continuous human driver data representing large amounts (e.g. millions or miles/kilometers) of driving data. Continuous human driver data may be, for example, the Transportation Research Board's second Strategic Highway Research Program (SHRP-2) Report S2-S04A-RW-1: Naturalistic Driving Study. In examples, the continuous human driver data is a roadway information database that encompasses naturalistic driving data collected during physical roadway traversal, and includes supplemental traffic data, other existing roadway data, and supplemental traffic operations data. Additionally, for ease of illustration the continuous human driving data is illustrated using a bird's eye view. However, the continuous human driver data can be any representation of longitudinal human driving.

In the example of FIG. 6, a first timestamp 608A, a second timestamp 608B, and third timestamp 608C, and a fourth timestamp 608D are illustrated. Each of the timestamps 608 illustrates the vehicle 602, the vehicle 604, and the vehicle 606 navigating near an intersection 610. As illustrated, the vehicle 602 has a right of way through the intersection 610 due to no stop signs or other traffic control measures present along the lane of travel occupied by the vehicle 602. By contrast, the vehicle 604 and the vehicle 606 each encounter a respective traffic control measure 612, 614 (e.g., a stop sign, flashing red lights, or other traffic control indicators) that instruct the vehicles 604 and 606 to come to a stop and yield to crossing traffic, which includes the vehicle 602. In the example of FIG. 6, arrows associated with each of the vehicle 602, the vehicle 604, and the vehicle 606 indicate motion of each of the vehicles 602, 604, 606 (e.g., movement along the direction of the arrow) in the continuous human driver data 600.

In the example of FIG. 6, at timestamp 608A, each of the vehicles are in motion toward the intersection 610. As generally described above, the vehicle 602 has the right of way to cross the intersection 610 while the vehicle 604 and the vehicle 606 should come to a complete stop at their respective traffic control measure 612, 614 prior to crossing the intersection 610. As illustrated at timestamp 608B, the vehicle 606 comes to a complete stop at its traffic control measure 612. The vehicle 604 fails to stop at its traffic control measure 614 and continues through the intersection 610. In the example of FIG. 6, the vehicle 604 enters the intersection prior to the vehicle 602. At timestamp 608C, the vehicle 606 remains stopped at its respective traffic control measure 612. The vehicle 602 enters the intersection 610 and executes one or more maneuvers to avoid a traffic conflict with the vehicle 604. In embodiments, the one or more maneuvers executed by the vehicle 602 include kinematic triggers that correlate to near traffic conflicts, as illustrated at timestamp 608C. As illustrated, the vehicle 604 continues across the intersection 610 as indicated by the arrow. At timestamp 608D, a near traffic conflict is avoided by the vehicle 602 and the vehicle 604. The vehicle 604 continues along its respective path, and the vehicle 602 completes its traversal of the intersection 610.

In embodiments, continuous driving data (e.g., a record) that is representative of vehicle navigation within an operational design domain (ODD) is obtained by a remote system. The remote system may be an autonomous vehicle system that is the same as or similar to remote AV system 114, a fleet management system 116 that is the same as or similar to fleet management system 116, a V2I system that is the same as or similar to V2I system 118 (FIG. 1), and/or the like. At the remote system, predetermined criteria is applied to the continuous driving data to extract safety critical scenarios. Because the scenarios are extracted from a record of continuous driving data, which includes naturalistic driving data associated with human drivers, the AV response to the scenarios is indicative of AV performance in those safety critical scenarios. In embodiments, the present techniques enable a comparison of human driver performance with AV performance over a representative sample of known, difficult driving scenarios. Traditional techniques use large data sets that include driving data across a large distance, such as millions of miles or kilometers. The present techniques enable a shorter validation process by using extracted scenarios for validation instead of millions of miles.

Figure 7:
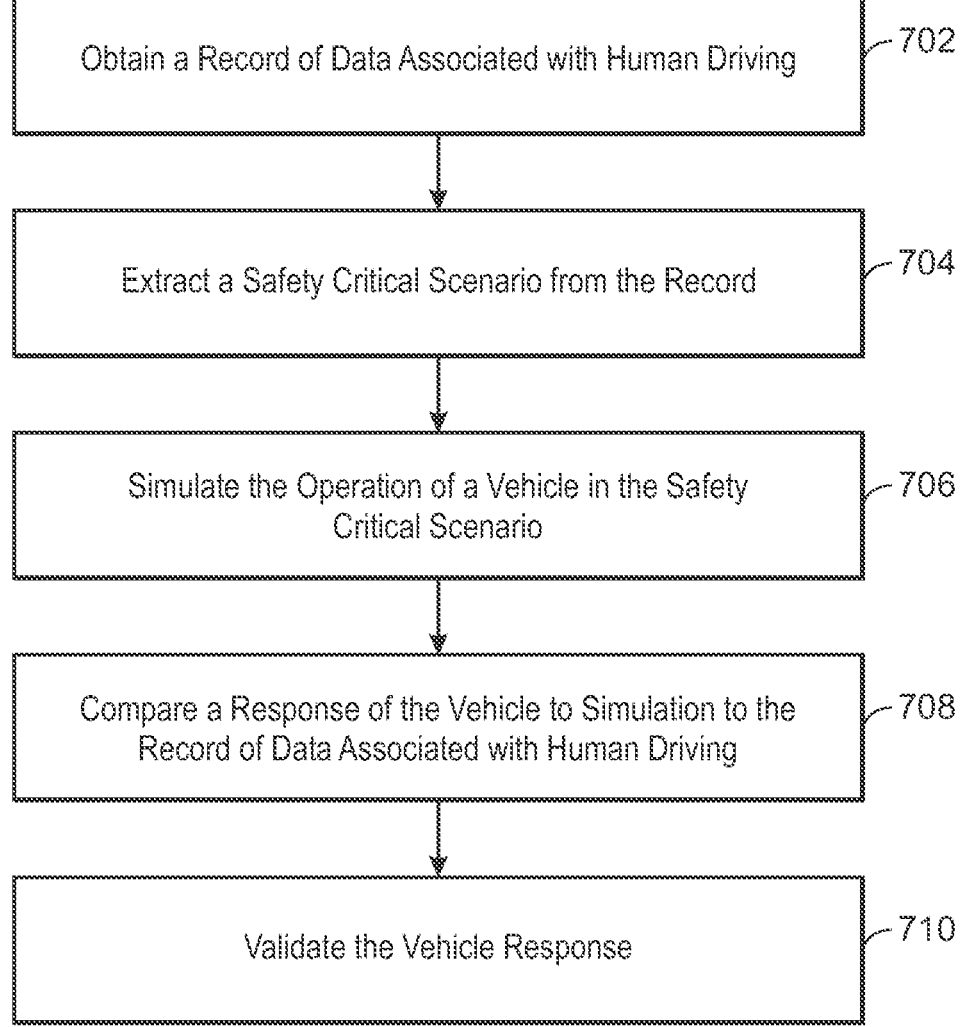
FIG. 7 is a process flow diagram of a process that enables autonomous vehicle validation using real-world adversarial events.

FIG. 7 is a process flow diagram of a process 700 that enables autonomous vehicle validation using real-world adversarial events. In some embodiments, the process 700 is implemented (e.g., completely, partially, etc.) using a system that is the same as or similar to remote AV system 114, fleet management system 116, and/or V2I system 118 described in reference to FIG. 1. In some embodiments, the process 700 is implemented (e.g., completely, partially, etc.) using an AV system that is the same as or similar to autonomous system 202, described in reference to FIG. 2. In some embodiments, the process 700 is implemented (e.g., completely, partially, etc.) using a device that is the same as or similar to device 300, described in reference to FIG. 3. In some embodiments, the process 700 is implemented (e.g., completely, partially, etc.) using a system that is the same as or similar to autonomous vehicle compute 400, described in reference to FIG. 4. In some embodiments, the process 700 is implemented using any of the above-noted systems in cooperation with one another.

At block 702, a record of data associated with is obtained. In embodiments, the record is representative of vehicle navigation within an operational design domain (ODD). The record is continuous human driving data that covers a large number of miles as driven by a large number of distinct drivers, such as the exemplary continuous human driving data described with respect to FIG. 6. The record includes data associated with the environment. For example, the record includes corresponding autonomous vehicle system inputs that replicate the environment as captured in the continuous human driving data.

At block 704, safety critical scenarios are extracted from the record. The safety critical scenarios form a test data set. In embodiments, predetermined criteria are applied to the human driving data to extract safety critical scenarios. In embodiments, safety critical scenarios refer to traffic conflicts and near traffic conflicts in the human driving data. For example, a safety critical scenario is an event or sequence of events involving objects (e.g., vehicles, pedestrians, etc.) acting outside the control of the human driver in which the human driver initiates an evasive maneuver to avoid an unsafe event/occurrence, as occurs in the human driving data. In some embodiments, the objects are stationary objects.

In embodiments, a safety critical scenario is based on a set of kinematic triggers that automatically labels an event as a candidate safety critical scenario. The kinematic triggers include a swerve, breaking events above a predefined threshold, accelerations above certain thresholds, and the like. In embodiments, manual review of the candidate safety critical scenario is performed to confirm the label of an event as a near traffic conflict if an evasive action was required for a traffic conflict to be avoided, or a traffic conflict. In examples, a safety critical scenario represents an event where the driver encounters an event in the continuous human driver data that requires action from the human to avoid a traffic conflict. Within the human driver data, safety critical events occur organically, in a way that happens or develops naturally over time in the real-world, without being forced or planned.

At block 706, the operation of a vehicle is simulated according to the safety critical scenario. In embodiments, safety critical scenarios are reproduced either on a simulator or a track, or some combination thereof. In examples, the scenarios are characterized by sensor data provided as input to a simulator that replicates the AV compute. Simulating the operation of a vehicle during safety critical scenarios is performed according to the test data set by applying the at least one safety critical scenario to one or more systems of the vehicle. In embodiments, simulation includes feeding sensors of the AV sensor data corresponding to the event or sequence of events outside the control of the human driver. For example, a record can include 20 million miles of driving by human drivers. The test data set includes safety critical scenarios extracted from the record that are representative of difficult situations that occur within those 20 million miles of driving.

At block 708, a response of the simulation is compared to the record of data associated with human driving. In embodiments, a response of the vehicle is an output of the vehicle systems. The response of the vehicle during simulated operation is compared to the operation of a vehicle in the record. The comparison is homogenous, based on the same continuous human driver data. In this manner, the scenario based comparison is an apples-to-apples comparison of data as opposed to statistical based comparison. Accordingly, the present techniques generate a test set that is derived from a continuous human driven data set, and compares the AV to human driving. The present techniques use a naturalistic driving study or other source to extract safety critical scenarios within a predetermined ODD. Generally, the proportion of safety critical events ending in a traffic conflict is a measure of human performance in safety critical scenarios. The present techniques reproduce scenarios (most likely in different variants of simulation) to measure fraction of scenarios resulting in a traffic conflict with the AV. This is a measure of AV performance in safety critical scenarios. In embodiments, the present techniques use on-road testing (e.g., road-based testing) of the AV to measure frequency of safety critical scenarios to extrapolate an overall traffic conflict rate. Additionally, in embodiments, at least one parameter associated with operation of the simulated vehicles is determined in the at least one safety critical scenario. The at least one parameter is tuned to generate a variant safety critical scenario to create a variant test data set.

At block 710, the vehicle response is validated. In embodiments, validation includes confirmation, through the provision of objective evidence, that the requirements for a specific intended use or application have been fulfilled. The vehicle response is validated during the simulated operation according to the test data set by transforming the delay in the vehicle response into a safety indicator, wherein the safety indicator is based on a performance of the vehicle under evaluation. Additionally, or alternatively, violations of predetermined rules associated with autonomous driving system operation (e.g., elements of a rulebook) are expressed as a safety indicator. Referring to FIG. 6, predetermined rules associated with autonomous driving system operation include, for example, "stop at stop sign," "yield to other vehicles at stop sign," or "maintain clearance with active vehicle." Violations of these rules in response to a near-traffic conflict or traffic conflict during a simulation are provided as a safety indicator.

Figure 8:
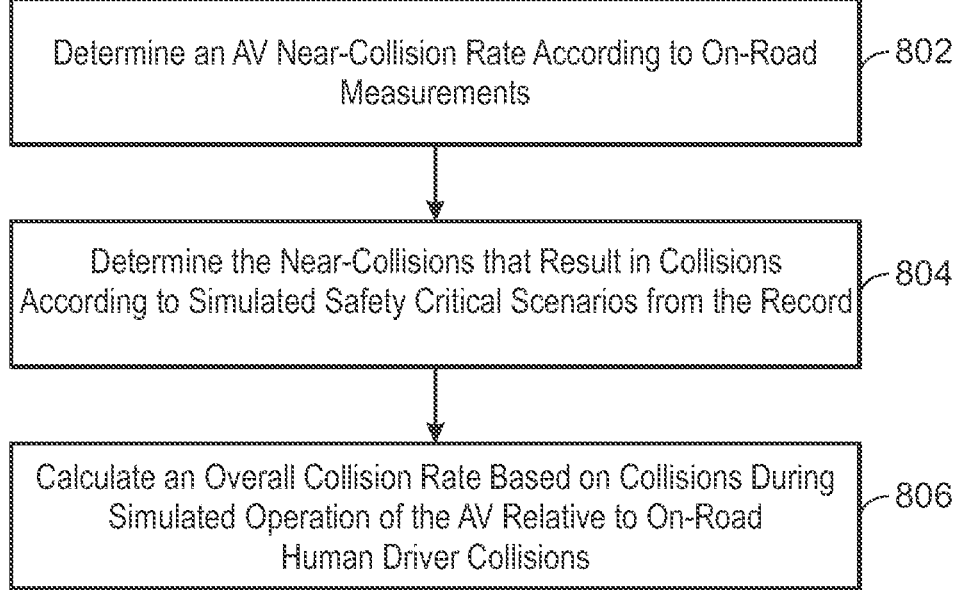
FIG. 8 is a process flow diagram of a process determining traffic conflict rates.

FIG. 8 is a process flow diagram of a process 800 determining traffic conflict rates. In some embodiments, the process 800 is implemented (e.g., completely, partially, etc.) using a system that is the same as or similar to remote AV system 114, fleet management system 116, and/or V2I system 118 described in reference to FIG. 1. In some embodiments, the process 800 is implemented (e.g., completely, partially, etc.) using an AV system that is the same as or similar to autonomous system 202, described in reference to FIG. 2. In some embodiments, the process 800 is implemented (e.g., completely, partially, etc.) using a device that is the same as or similar to device 300, described in reference to FIG. 3. In some embodiments, the process 800 is implemented (e.g., completely, partially, etc.) using a system that is the same as or similar to autonomous vehicle compute 400, described in reference to FIG. 4. In some embodiments, the process 800 is implemented using any of the above-noted systems in cooperation with one another.

In embodiments, a traffic conflict rate quantifies how often safety critical scenarios are encountered as well as performance in the safety critical scenarios. A traffic conflict rate is a measure of how often the vehicle is in a traffic conflict based on simulating the operation of the vehicle, wherein the traffic conflict rate is determined based on the number of traffic conflicts that occurred during the simulated operation of the vehicle relative to (e.g., divided by) how often a human driver collided when operating a vehicle.

In embodiments, the present techniques measure how often the AV encounters safety critical scenarios and quantifies the AV performance in the safety critical scenarios to determine an overall traffic conflict rate of the AV.

At block 802, an AV near-traffic conflict rate is determined. In embodiments, the present techniques determine a traffic conflict rate of the AV based on the on-road measurements extracted through the application of predetermined criteria to the a record of continuous human driver data.

At block 804, the near-traffic conflicts that result in traffic conflicts are determined according to simulated safety critical scenarios from the record. In examples, the response to the AV is quantified using a traffic conflict rate. Generally, human driver performance in the continuous human driver data is known. For example, the present techniques calculate a traffic conflict rate (e.g., scenarios where a traffic conflict occurs) among the safety critical scenarios. In particular, the number of instances of a traffic conflict by a human in the safety critical scenarios are determined. Through simulations, a number of traffic conflicts by the simulated AV is determined.

At block 806, an overall traffic conflict rate is calculated based on traffic conflicts during simulated operation of the AV relative to on-road human driver traffic conflicts. In embodiments, the present techniques combine on-road measurement of AV near traffic conflicts with simulated traffic conflicts to extrapolate overall traffic conflict rate as follows:

$$C_h = NC_h * P(NC_h)$$

$$C_{AV} = NC_{AV} * P(NC_{AV})$$

In embodiments, the traffic conflict rate of the AV $C_{AV}$ is measured on-road, while the fraction of near-traffic conflicts that end in traffic conflicts $P(NC_{AV})$ is measured in simulation. The right term (the fraction of near-traffic conflicts that end in traffic conflicts) represents the handling of safety critical scenarios.

In embodiments, the present techniques enable significant reductions in mileage requirements for safety validation. In examples, if the AV has a traffic conflict rate that is one third of the traffic conflict rate for human drivers in safety critical scenarios, and the safety critical scenarios occur at five times the rate of traffic conflicts, the mileage requirement would be one fifteenth of what would be required for validating a traffic conflict rate of one third that of human drivers through on road mileage alone. An assumption is that traffic conflicts are expressed as a subset of near traffic conflicts (e.g., the meet near-traffic conflict criteria). Accordingly, the present techniques validate based on how often the AV gets into near traffic conflicts (e.g., safety critical events) as opposed to validation using all mileage collected. This in turn reduces the mileage requirement for validation. Generally, the near traffic conflicts occur more often than traffic conflicts themselves.

Figure 9:
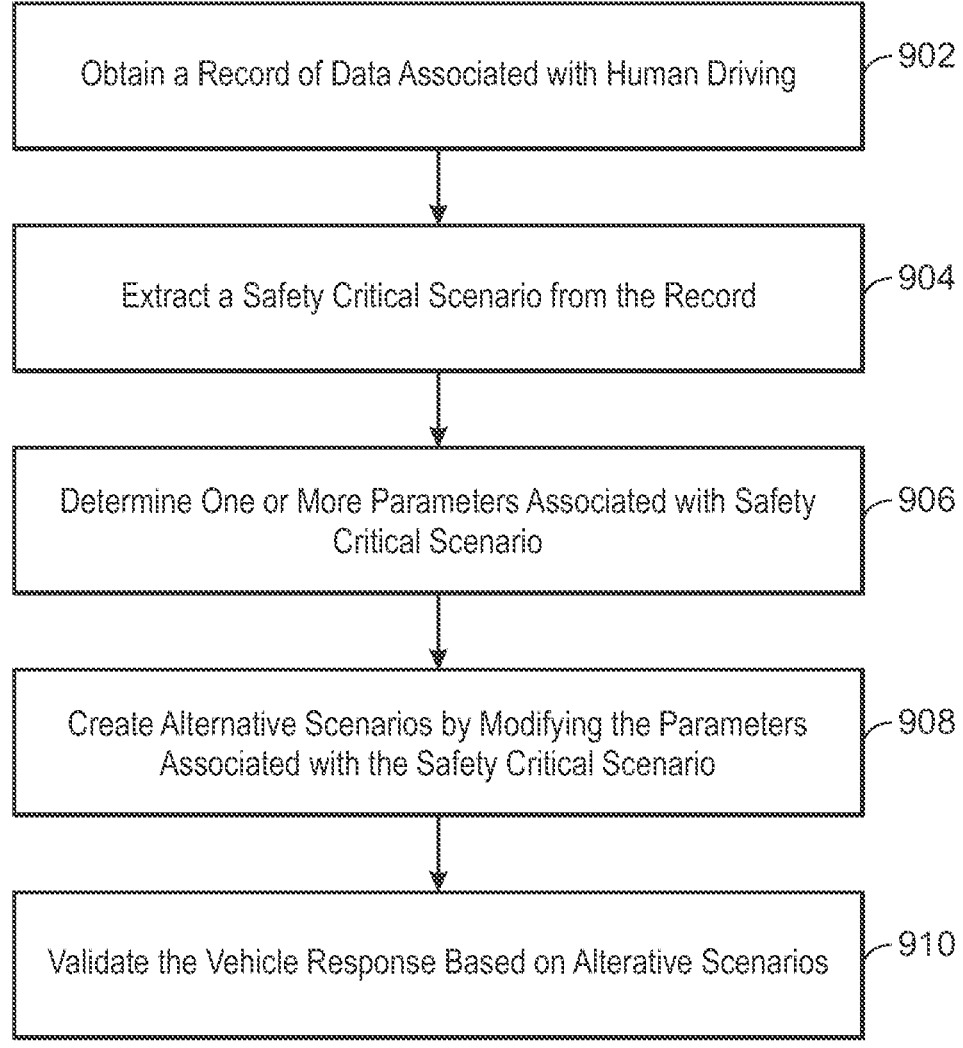
FIG. 9 is a process flow diagram of logical scenarios for validation.

FIG. 9 is a process flow diagram of a process 900 for creating logical scenarios for validation. In some embodiments, the process 900 is implemented (e.g., completely, partially, etc.) using a system that is the same as or similar to remote AV system 114, fleet management system 116, and/or V2I system 118 described in reference to FIG. 1. In some embodiments, the process 900 is implemented (e.g., completely, partially, etc.) using an AV system that is the same as or similar to autonomous system 202, described in reference to FIG. 2. In some embodiments, the process 900 is implemented (e.g., completely, partially, etc.) using a device that is the same as or similar to device 300, described in reference to FIG. 3. In some embodiments, the process 900 is implemented (e.g., completely, partially, etc.) using a system that is the same as or similar to autonomous vehicle compute 400, described in reference to FIG. 4. In some embodiments, the process 900 is implemented using any of the above-noted systems in cooperation with one another.

In examples, the safety critical events are logical scenarios associated with one or more parameters. Manipulation of the one or more parameters can create a concrete scenario using the parameterized logical scenario. Accordingly, in a logical scenario parameters are tuned to create a multitude of different concrete scenarios out of a single logical scenario. Generally, parameters are associated with operation of the simulated vehicles, and variation of the parameters includes slightly changing how the other simulated vehicles move relative to the simulated AV.

At block 902, a record of data associated with human driving is obtained. At block 904, a safety critical scenario is extracted from the record. At block 906, one or more parameters associated with the safety critical scenario are determined. In examples, the parameters are variables of the safety critical scenario that can be varied to observe the AV response. In examples, the parameters include a speed of the AV, a location of the AV, a heading of the AV, AV stack system readiness; sensor readiness, braking response times, and the like. Further, parameters include timing of cut in by the AV during a lane change, lane width, etc.

At block 908, alternative scenarios are created by modifying or tuning the parameters associated with the safety critical scenario. For example, consider a braking response time as a tunable parameter. Alternative scenarios include variations of the braking response time to determine the likelihood that an AV will encounter a traffic conflict based on how far the AV proceeds into a critical situation before evasive maneuvers are initiated (e.g., braking response time). Generally, in a scenario, the closer the AV gets to a traffic conflict before braking and applying evasive maneuvers, the more likely a traffic conflict will occur. Accordingly, the present techniques compare how soon AV initiates an evasive maneuver in a scenario compared to a human driver through simulations based on alternative scenarios. At block 910, the vehicle response is validated based on the alternative scenarios. In examples, the comparison is translated into probabilistically defined measure of performance. For example, consider that human drivers are involved in traffic conflicts in 70% of the scenarios. In this example, the AV tended to brake earlier when compared to human drivers. As a result, the AV is less likely to be involved in a traffic conflict. Based on the known human traffic conflict rate, the present techniques translate simulated reaction delays at the AV into a traffic conflict rate for the AV.

In examples, the calculation of traffic conflict rates based on reaction times in human driving data is as follows:

$$P(NC_{human})=P(\tau_c \le x_{human})=1-F_{x_{human}}(\tau_c)$$

where $F_{x_{human}}(\tau_c)$ corresponds to a cumulative density function from a fitted distribution to the response delays. Similarly, a calculation of traffic conflict rates based on reaction times of an AV is as follows:

$$P(NC_{AV})=P(\tau_c \le x_{AV})=1-F_{x_{AV}}(\tau_c)$$

The present techniques provide additional validation techniques that increase confidence in AV safety performance. The additional validation yields an increase in the rigor and confidence in the AV. Additionally, the present techniques have lower mileage requirements when compared to purely statistical comparison, hundreds of thousands or millions of miles are driven to statistically validate performance of an AV. In embodiments, the present techniques are executed in parallel with statistical, road based validation.

Additionally, the present techniques enable validation that mitigates safety critical scenarios. The present techniques add an additional layer of safety validation by evaluating aspects of driving performance (e.g., how well a vehicle handles safety critical events) that are typically neglected during traditional statistical based validation techniques. Further, the present techniques link safety critical scenarios used for testing to an organic record of how humans drive as a part of a longitudinal data set. As a result, the present techniques can provide a benchmark of how well an AV performs as compared to the aggregate human driving present in the data set used to generate the test set and measure our performance against. The present techniques use organic scenarios that are tied to organic driving data sets, so performance is more relevant than using either synthetic scenarios or isolated organic scenarios.

According to some non-limiting embodiments or examples, provided is a method, comprising: obtaining, using at least one processor, a record of human driver data, the human driver data associated with operation of vehicles by human drivers during at least one period of time; extracting, using the at least one processor, at least one safety critical scenario from the record to create a test data set associated with operation of vehicles by human drivers during safety critical scenarios, wherein predetermined criteria are applied to the record to extract the at least one safety critical scenario; simulating, using the at least one processor, operation of a vehicle under evaluation during safety critical scenarios according to the test data set by applying the at least one safety critical scenario to one or more systems of the vehicle under evaluation; comparing, using the at least one processor, a response of the vehicle under evaluation during the simulated operation to the operation of vehicles by human drivers in the human driver data, wherein the comparison is a homogenous comparison; and validating, using the at least one processor, a response of the vehicle under evaluation during the simulated operation according to the test data set by transforming the vehicle response into a safety indicator, wherein the safety indicator is based on a performance of the vehicle under evaluation.

According to some non-limiting embodiments or examples, provided is a system, comprising at least one processor, and at least one non-transitory storage media storing instructions that, when executed by the at least one processor, cause the at least one processor to: obtain a record of human driver data, the human driver data associated with operation of vehicles by human drivers during at least one period of time; extract at least one safety critical scenario from the record to create a test data set associated with operation of vehicles by human drivers during safety critical scenarios, wherein predetermined criteria are applied to the record to extract the at least one safety critical scenario; simulate operation of a vehicle under evaluation during safety critical scenarios according to the test data set by applying the at least one safety critical scenario to one or more systems of the vehicle under evaluation; compare a response of the vehicle under evaluation during the simulated operation to the operation of vehicles by human drivers in the human driver data, wherein the comparison is a homogenous comparison; and validate a response of the vehicle under evaluation during the simulated operation according to the test data set by transforming the vehicle response into a safety indicator, wherein the safety indicator is based on a performance of the vehicle under evaluation.

According to some non-limiting embodiments or examples, provided is at least one non-transitory computer-readable medium comprising one or more instructions that, when executed by at least one processor, cause the at least one processor to: obtain a record of human driver data, the human driver data associated with operation of vehicles by human drivers during at least one period of time; extract at least one safety critical scenario from the record to create a test data set associated with operation of vehicles by human drivers during safety critical scenarios, wherein predetermined criteria are applied to the record to extract the at least one safety critical scenario; simulate operation of a vehicle under evaluation during safety critical scenarios according to the test data set by applying the at least one safety critical scenario to one or more computer-readable mediums of the vehicle under evaluation; compare a response of the vehicle under evaluation during the simulated operation to the operation of vehicles by human drivers in the human driver data, wherein the comparison is a homogenous comparison; and validate a response of the vehicle under evaluation during the simulated operation according to the test data set by transforming the vehicle response into a safety indicator, wherein the safety indicator is based on a performance of the vehicle under evaluation.

Further non-limiting aspects or embodiments are set forth in the following numbered clauses:

Clause 1: A method comprising: obtaining, using at least one processor, a record of human driver data, the human driver data associated with operation of vehicles by human drivers during at least one period of time; extracting, using the at least one processor, at least one safety critical scenario from the record to create a test data set associated with operation of vehicles by human drivers during safety critical scenarios, wherein predetermined criteria are applied to the record to extract the at least one safety critical scenario; simulating, using the at least one processor, operation of a vehicle under evaluation during safety critical scenarios according to the test data set by applying the at least one safety critical scenario to one or more systems of the vehicle under evaluation; comparing, using the at least one processor, a response of the vehicle under evaluation during the simulated operation to the operation of vehicles by human drivers in the human driver data, wherein the comparison is a homogenous comparison; and validating, using the at least one processor, a response of the vehicle under evaluation during the simulated operation according to the test data set by transforming the vehicle response into a safety indicator, wherein the safety indicator is based on a performance of the vehicle under evaluation.

Clause 2: The method of clause 1, further comprising calculating a traffic conflict rate that is a measure of how often the vehicle under evaluation is in a traffic conflict based on simulating the operation of the vehicle under evaluation, wherein the traffic conflict rate is determined based on a number of traffic conflicts that occur during the simulated operation of the vehicle under evaluation relative to how often human drivers collided when operating vehicles in the human driver data.

Clause 3: The method of clauses 1 or 2, further comprising calculating a near traffic conflict rate that is a measure of how often the vehicle under evaluation engages in near traffic conflicts when simulating the operation of the vehicle under evaluation according the test data set divided by how often a human driver engages in near traffic conflicts in the human driver data.

Clause 4: The method of any of clauses 1-3, comprising: determining, using the at least one processor, at least one parameter associated with operation of the simulated vehicles in the at least one safety critical scenario; and tuning, using the at least one processor, the at least one parameter to generate a variant safety critical scenario to create a variant test data set.

Clause 5: The method of clause 4, further comprising simulating operation of the vehicle under evaluation according to the variant test data set by applying the at least one safety critical scenario to one or more systems of the vehicle under evaluation.

Clause 6: The method of any of clauses 1-5, comprising: calculating, using the at least one processor, a probabilistically defined measure of performance, wherein a likelihood that the vehicle under evaluation will collide is based on an amount of time the vehicle under evaluation proceeds during simulation using the test data set before making an evasive maneuver in a safety critical scenario.

Clause 7: The method of any of clauses 1-6, wherein validating the vehicle response occurs in parallel with road-based testing.

Clause 8: The method of any of clauses 1-7, wherein the predetermined criteria comprises one or more kinematic triggers.

Clause 9: The method of any of clauses 1-8, wherein the safety critical scenario represents a traffic conflict in the human driver data.

Clause 10: The method of any clauses 1-9, wherein human driver data comprises sensor data captured during operation of a vehicle by a human driver.

Clause 11: A system, comprising: at least one processor, and at least one non-transitory storage media storing instructions that, when executed by the at least one processor, cause the at least one processor to: obtain a record of human driver data, the human driver data associated with operation of vehicles by human drivers during at least one period of time; extract at least one safety critical scenario from the record to create a test data set associated with operation of vehicles by human drivers during safety critical scenarios, wherein predetermined criteria are applied to the record to extract the at least one safety critical scenario; simulate operation of a vehicle under evaluation during safety critical scenarios according to the test data set by applying the at least one safety critical scenario to one or more systems of the vehicle under evaluation; compare a response of the vehicle under evaluation during the simulated operation to the operation of vehicles by human drivers in the human driver data, wherein the comparison is a homogenous comparison; and validate a response of the vehicle under evaluation during the simulated operation according to the test data set by transforming the vehicle response into a safety indicator, wherein the safety indicator is based on a performance of the vehicle under evaluation.

Clause 12: The system of clause 11, further comprising calculating a traffic conflict rate that is a measure of how often the vehicle under evaluation is in a traffic conflict based on simulating the operation of the vehicle under evaluation, wherein the traffic conflict rate is determined based on a number of traffic conflicts that occur during the simulated operation of the vehicle under evaluation relative to how often human drivers collided when operating vehicles in the human driver data.

Clause 13: The system of clauses 11 or 12, further comprising calculating a near traffic conflict rate that is a measure of how often the vehicle under evaluation engages in near traffic conflicts when simulating the operation of the vehicle under evaluation according the test data set divided by how often a human driver engages in near traffic conflicts in the human driver data.

Clause 14: The system of any of clauses 11-13, comprising: determining, using the at least one processor, at least one parameter associated with operation of the simulated vehicles in the at least one safety critical scenario; and tuning, using the at least one processor, the at least one parameter to generate a variant safety critical scenario to create a variant test data set.

Clause 15: The system of clause 14, further comprising simulating operation of the vehicle under evaluation according to the variant test data set by applying the at least one safety critical scenario to one or more systems of the vehicle under evaluation.

Clause 16: The system of any of clauses 11-15, comprising: calculating, using the at least one processor, a probabilistically defined measure of performance, wherein a likelihood that the vehicle under evaluation will collide is based on an amount of time the vehicle under evaluation proceeds during simulation using the test data set before making an evasive maneuver in a safety critical scenario.

Clause 17: The system of any of clauses 11-16, wherein validating the vehicle response occurs in parallel with road-based testing.

Clause 18: The system of any of clauses 11-17, wherein the predetermined criteria comprises one or more kinematic triggers.

Clause 19: The system of any of clauses 11-18, wherein the safety critical scenario represents a traffic conflict in the human driver data.

Clause 20: The system of any clauses 11-19, wherein human driver data comprises sensor data captured during operation of a vehicle by a human driver.

Clause 21: At least one non-transitory storage media storing instructions that, when executed by at least one processor, cause the at least one processor to: obtain a record of human driver data, the human driver data associated with operation of vehicles by human drivers during at least one period of time; extract at least one safety critical scenario from the record to create a test data set associated with operation of vehicles by human drivers during safety critical scenarios, wherein predetermined criteria are applied to the record to extract the at least one safety critical scenario; simulate operation of a vehicle under evaluation during safety critical scenarios according to the test data set by applying the at least one safety critical scenario to one or more computer-readable mediums of the vehicle under evaluation; compare a response of the vehicle under evaluation during the simulated operation to the operation of vehicles by human drivers in the human driver data, wherein the comparison is a homogenous comparison; and validate a response of the vehicle under evaluation during the simulated operation according to the test data set by transforming the vehicle response into a safety indicator, wherein the safety indicator is based on a performance of the vehicle under evaluation.

Clause 22: The at least one non-transitory storage media of clause 21, further comprising calculating a traffic conflict rate that is a measure of how often the vehicle under evaluation is in a traffic conflict based on simulating the operation of the vehicle under evaluation, wherein the traffic conflict rate is determined based on a number of traffic conflicts that occur during the simulated operation of the vehicle under evaluation relative to how often human drivers collided when operating vehicles in the human driver data.

Clause 23: The at least one non-transitory storage media of clauses 21 or 22, further comprising calculating a near traffic conflict rate that is a measure of how often the vehicle under evaluation engages in near traffic conflicts when simulating the operation of the vehicle under evaluation according the test data set divided by how often a human driver engages in near traffic conflicts in the human driver data.

Clause 24: The at least one non-transitory storage media of any of clauses 21-23, comprising: determining, using the at least one processor, at least one parameter associated with operation of the simulated vehicles in the at least one safety critical scenario; and tuning, using the at least one processor, the at least one parameter to generate a variant safety critical scenario to create a variant test data set.

Clause 25: The at least one non-transitory storage media of clause 24, further comprising simulating operation of the vehicle under evaluation according to the variant test data set by applying the at least one safety critical scenario to one or more computer-readable mediums of the vehicle under evaluation.

Clause 26: The at least one non-transitory storage media of any of clauses 21-25, comprising: calculating, using the at least one processor, a probabilistically defined measure of performance, wherein a likelihood that the vehicle under evaluation will collide is based on an amount of time the vehicle under evaluation proceeds during simulation using the test data set before making an evasive maneuver in a safety critical scenario.

Clause 27: The at least one non-transitory storage media of any of clauses 21-26, wherein validating the vehicle response occurs in parallel with road-based testing.

Clause 28: The at least one non-transitory storage media of any of clauses 21-27, wherein the predetermined criteria comprises one or more kinematic triggers.

Clause 29: The at least one non-transitory storage media of any of clauses 21-28, wherein the safety critical scenario represents a traffic conflict in the human driver data.

Clause 30: The at least one non-transitory storage media of any clauses 21-29, wherein human driver data comprises sensor data captured during operation of a vehicle by a human driver.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
obtaining, using at least one processor, an organic record of human driver data, the human driver data associated with operation of vehicles by human drivers during at least one period of time;
extracting, using the at least one processor, at least one safety critical scenario from the organic record to create a test data set associated with operation of vehicles by human drivers during safety critical scenarios, wherein predetermined criteria are applied to the organic record to automatically label an event in the organic record as the at least one safety critical scenario;
simulating, using the at least one processor, operation of a vehicle under evaluation during safety critical scenarios according to the test data set by applying the at least one safety critical scenario to one or more systems of the vehicle under evaluation; and
comparing, using the at least one processor, a response of the vehicle under evaluation during the simulated operation to the operation of vehicles by human drivers in the human driver data, wherein the comparison is a homogenous comparison to enable validating the response of the vehicle under evaluation during the simulated operation according to the test data set, wherein the vehicle response is transformed into a safety indicator based on a performance of the vehicle under evaluation.

2. The method of claim 1, further comprising calculating a traffic conflict rate that is a measure of how often the vehicle under evaluation is in a traffic conflict based on simulating the operation of the vehicle under evaluation, wherein the traffic conflict rate is determined based on a number of traffic conflicts that occur during the simulated operation of the vehicle under evaluation relative to how often human drivers collided when operating vehicles in the human driver data.

3. The method of claim 1, further comprising calculating a near traffic conflict rate that is a measure of how often the vehicle under evaluation engages in near traffic conflicts when simulating the operation of the vehicle under evaluation according the test data set divided by how often a human driver engages in near traffic conflicts in the human driver data.

4. The method of claim 1, comprising:
determining, using the at least one processor, at least one parameter associated with operation of the simulated vehicles in the at least one safety critical scenario; and
tuning, using the at least one processor, the at least one parameter to generate a variant safety critical scenario to create a variant test data set.

5. The method of claim 4, further comprising simulating operation of the vehicle under evaluation according to the variant test data set by applying the at least one safety critical scenario to one or more systems of the vehicle under evaluation.

6. The method of claim 1, comprising:
calculating, using the at least one processor, a probabilistically defined measure of performance, wherein a likelihood that the vehicle under evaluation will collide is based on an amount of time the vehicle under evaluation proceeds during simulation using the test data set before making an evasive maneuver in a safety critical scenario.

7. The method of claim 1, wherein validating the response of the vehicle occurs in parallel with road-based testing.

8. The method of claim 1, wherein the predetermined criteria comprises one or more kinematic triggers.

9. The method of claim 1, wherein the safety critical scenario represents a traffic conflict in the human driver data.

10. A system, comprising:
at least one processor, and
at least one non-transitory storage media storing instructions that, when executed by the at least one processor, cause the at least one processor to:
obtain an organic record of human driver data, the human driver data associated with operation of vehicles by human drivers during at least one period of time;
extract at least one safety critical scenario from the organic record to create a test data set associated with operation of vehicles by human drivers during safety critical scenarios, wherein predetermined criteria are applied to the organic record to automatically label an event in the organic record as the at least one safety critical scenario;
simulate operation of a vehicle under evaluation during safety critical scenarios according to the test data set by applying the at least one safety critical scenario to one or more systems of the vehicle under evaluation; and compare a response of the vehicle under evaluation during the simulated operation to the operation of vehicles by human drivers in the human driver data, wherein the comparison is a homogenous comparison to validate the response of the vehicle under evaluation during the simulated operation according to the test data set, wherein the response of the vehicle is transformed into a safety indicator based on a performance of the vehicle under evaluation.

11. The system of claim 10, further comprising calculating a traffic conflict rate that is a measure of how often the vehicle under evaluation is in a traffic conflict based on simulating the operation of the vehicle under evaluation, wherein the traffic conflict rate is determined based on a number of traffic conflicts that occur during the simulated operation of the vehicle under evaluation relative to how often human drivers collided when operating vehicles in the human driver data.

12. The system of claim 10, further comprising calculating a near traffic conflict rate that is a measure of how often the vehicle under evaluation engages in near traffic conflicts when simulating the operation of the vehicle under evaluation according the test data set divided by how often a human driver engages in near traffic conflicts in the human driver data.

13. The system of claim 10, comprising:
determining, using the at least one processor, at least one parameter associated with operation of the simulated vehicles in the at least one safety critical scenario; and
tuning, using the at least one processor, the at least one parameter to generate a variant safety critical scenario to create a variant test data set.

14. The system of claim 13, further comprising simulating operation of the vehicle under evaluation according to the variant test data set by applying the at least one safety critical scenario to one or more systems of the vehicle under evaluation.

15. The system of claim 10, comprising:
calculating, using the at least one processor, a probabilistically defined measure of performance, wherein a likelihood that the vehicle under evaluation will collide is based on an amount of time the vehicle under evaluation proceeds during simulation using the test data set before making an evasive maneuver in a safety critical scenario.

16. At least one non-transitory storage media storing instructions that, when executed by at least one processor, cause the at least one processor to:
obtain an organic record of human driver data, the human driver data associated with operation of vehicles by human drivers during at least one period of time;
extract at least one safety critical scenario from the organic record to create a test data set associated with operation of vehicles by human drivers during safety critical scenarios, wherein predetermined criteria are applied to the organic record to automatically label an event in the organic record as the at least one safety critical scenario;
simulate operation of a vehicle under evaluation during safety critical scenarios according to the test data set by applying the at least one safety critical scenario to one or more computer-readable mediums of the vehicle under evaluation; and
compare a response of the vehicle under evaluation during the simulated operation to the operation of vehicles by human drivers in the human driver data, wherein the comparison is a homogenous comparison to validate the response of the vehicle under evaluation during the simulated operation according to the test data set, wherein the vehicle response is transformed into a safety indicator based on a performance of the vehicle under evaluation.

17. The at least one non-transitory storage media of claim 16, further comprising calculating a traffic conflict rate that is a measure of how often the vehicle under evaluation is in a traffic conflict based on simulating the operation of the vehicle under evaluation, wherein the traffic conflict rate is determined based on a number of traffic conflicts that occur during the simulated operation of the vehicle under evaluation relative to how often human drivers collided when operating vehicles in the human driver data.

18. The at least one non-transitory storage media of claim 16, further comprising calculating a near traffic conflict rate that is a measure of how often the vehicle under evaluation engages in near traffic conflicts when simulating the operation of the vehicle under evaluation according the test data set divided by how often a human driver engages in near traffic conflicts in the human driver data.

19. The at least one non-transitory storage media of claim 16, comprising:

determining, using the at least one processor, at least one parameter associated with operation of the simulated vehicles in the at least one safety critical scenario; and tuning, using the at least one processor, the at least one parameter to generate a variant safety critical scenario to create a variant test data set.

20. The at least one non-transitory storage media of claim 19, further comprising simulating operation of the vehicle under evaluation according to the variant test data set by applying the at least one safety critical scenario to one or more computer-readable mediums of the vehicle under evaluation.

21. The method of claim 1, wherein the organic record of human driver data comprises data associated with distinct drivers.

22. The method of claim 1, wherein the predetermined criteria is based on kinematic triggers that correlate to near traffic conflicts.

23. The method of claim 1, wherein the predetermined criteria is based on historical data that corresponds to known loss-producing events, where a traffic conflict occurred.

\* \* \* \* \*